US007130888B1

(12) United States Patent
Hickman et al.

(10) Patent No.: US 7,130,888 B1
(45) Date of Patent: *Oct. 31, 2006

(54) METHOD AND APPARATUS FOR CONTROLLING A COMPUTER OVER A TCP/IP PROTOCOL NETWORK

(75) Inventors: Paul L. Hickman, Los Altos Hills, CA (US); Michael L. Gough, Saratoga, CA (US)

(73) Assignee: G&H Nevada-Tek, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/798,702

(22) Filed: Feb. 12, 1997

Related U.S. Application Data

(60) Provisional application No. 60/011,827, filed on Feb. 16, 1996.

(51) Int. Cl.
*G06F 15/16* (2006.01)
(52) U.S. Cl. ........................... 709/208; 709/204
(58) Field of Classification Search ............ 395/200.33; 709/203, 208, 202, 204, 205, 219, 229
See application file for complete search history.

(56) References Cited

U.S. PATENT DOCUMENTS

| | | | |
|---|---|---|---|
| 4,939,509 A | * | 7/1990 | Bartholomew et al. ...... 345/2.2 |
| 5,216,427 A | | 6/1993 | Yan et al. |
| 5,228,137 A | * | 7/1993 | Kleinerman et al. .......... 703/26 |
| 5,241,625 A | * | 8/1993 | Epard et al. ................. 345/502 |
| 5,315,711 A | * | 5/1994 | Barone et al. ............... 709/208 |
| 5,315,911 A | | 5/1994 | Ochi |
| 5,341,477 A | | 8/1994 | Pitkin et al. |
| 5,448,623 A | | 9/1995 | Wiedeman et al. |
| 5,548,646 A | * | 8/1996 | Aziz et al. ................... 713/153 |
| 5,555,416 A | | 9/1996 | Owens et al. |

(Continued)

OTHER PUBLICATIONS

Heylighen, World-Wide Web: a distributed hypermedia paradigm for global networking, Apr. 18, 1994.*

(Continued)

*Primary Examiner*—William C. Vaughn, Jr.
*Assistant Examiner*—Greg Bengzon
(74) *Attorney, Agent, or Firm*—TIPS Group

(57) ABSTRACT

The present invention permits virtually the entire functionality of a computer system to be made accessible over a network such as the Internet or an Intranet. More particularly, the present invention permits a computer system to be run as a "virtual machine" through a web page provided at a web site on the World Wide Web (WWW). The apparatus of the present invention includes a plurality of computers arranged in a wide area network (WAN) such as the Internet or an Intranet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

18 Claims, 11 Drawing Sheets

U.S. PATENT DOCUMENTS

| | | | |
|---|---|---|---|
| 5,568,612 A * | 10/1996 | Barrett et al. | 709/203 |
| 5,579,307 A | 11/1996 | Richetta et al. | |
| 5,581,390 A | 12/1996 | Fielden et al. | |
| 5,649,105 A * | 7/1997 | Aldred et al. | 709/220 |
| 5,668,999 A * | 9/1997 | Gosling | 717/4 |
| 5,675,828 A | 10/1997 | Stoel et al. | |
| 5,678,175 A | 10/1997 | Stuart et al. | |
| 5,692,126 A | 11/1997 | Templeton et al. | |
| 5,696,901 A * | 12/1997 | Konrad | 709/203 |
| 5,710,887 A * | 1/1998 | Chelliah et al. | 705/26 |
| 5,712,978 A * | 1/1998 | Lerner et al. | 709/224 |
| 5,715,823 A * | 2/1998 | Wood et al. | 128/904 |
| 5,727,129 A | 3/1998 | Barrett et al. | |
| 5,732,219 A * | 3/1998 | Blumer et al. | 709/227 |
| 5,732,351 A | 3/1998 | Olds et al. | |
| 5,737,560 A * | 4/1998 | Yohanan | 345/847 |
| 5,838,906 A * | 11/1998 | Doyle et al. | 709/202 |
| 5,898,772 A | 4/1999 | Connors et al. | |
| 5,909,454 A | 6/1999 | Schmidt et al. | |
| 5,909,545 A * | 6/1999 | Frese et al. | 709/208 |
| 5,913,920 A * | 6/1999 | Adams et al. | 709/204 |
| 5,968,129 A * | 10/1999 | Dillon et al. | 709/233 |
| 5,978,829 A | 11/1999 | Chung et al. | |
| 5,987,245 A * | 11/1999 | Gish | |
| 6,108,727 A * | 8/2000 | Boals et al. | 710/68 |
| 6,125,390 A * | 9/2000 | Touboul | 709/223 |
| 6,173,332 B1 * | 1/2001 | Hickman | 709/235 |
| 6,249,291 B1 * | 6/2001 | Popp et al. | 345/473 |
| 6,286,003 B1 * | 9/2001 | Muta | 707/10 |
| 6,329,984 B1 * | 12/2001 | Boss et al. | 715/723 |

OTHER PUBLICATIONS

Brown, "Special Edition Using Netscape 2", Chapters 22, 34; pp. 850-881, 1995.*
Gilder, The Coming Software Shift, Forbes ASAP, http://tmpwww.electrum.kth.se/edu/gru/Telesys/gilder.950828.html, Aug. 28, 1995.*
Freedman et al, "New Computational architectures for pricing derivatives", Computational Intelligence for Financial Engineering, IEEE/IEE Publications Ondisc, 1996.*
Dömel, "Mobile Telescript Agents and the Web", COMPCON '96 IEEE Compuer Society Int'l Conference, IEEE/IEE Publications Ondisc, 1996.*
Dean et al., "Java Security: From HotJava to Netscape and Beyond", Security and Privacy, 1996 IEEE Symposium, IEEE/IEE Publications Ondisc, 1996.*
Hamilton, "Java and JDBC: Tools Supporting Data-Centric Business Application Development", Assessment of Software, 1996 International Symposium, IEEE/IEE Publications Ondisc, 1996.*
Pazandak et al., "Interactive multi-user multimedia environments on the Internet: An overview of DAMSEL and its implementation", Multimedia Computing and Systems, 1996 Int'l Conference, IEEE/IEE Publications Ondisc, 1996.*
Arano et al., "Emerging technologies for network software development: past present and future", Computer Software and Applications Conference, 1996 COMPSAC, IEEE/IEE Publications Ondisc, 1996.*
Chandy et al., "A world-wide distributed system using Java and the Internet", High Performance Distributed Computing, 1996 5th Int'l Symposium, IEEE/IEE Publications Ondisc, 1996.*
Fox et al., "Towards Web/Java-based high performance distributed computing -an evolving virtual machine", High Performance Distributed Computing, 1997 tth Int'l Symposium, IEEE/IEE Publications Ondisc, 1996.*
"Running A WWW Service—3 World-Wide Web Browsers", http://www.ub2.lu.se/kelly/handbook-3.html, 1998.*
Paper Sessions from Fifth International World Wide Web Conference, May 6-10, 1996, Paris, France: Dossic et al, "WWW Access to Legacy Client/Server Applications"; Ciancarini et al., PageSpace: An Architecture to Coordinate Distributed Applications on the, 1996.*
Frontier Technologies Networking Products, http://www.frontiertech.com/PRODUCT/PRODMAIN.HTM, 1998.*
Microsoft Systems Management Server for WindowsNT, Adminstratior's Guide, Copyright 1993-94.*
"More Data at Twice the Speed," San Jose Mercury News, Friday, Mar. 1, 1996, pp. 2c.
"Farallon Netopia Virtual Office," NetGuide, Jun. 1997, pp. 24.
"Farallon to Add Scripting Hooks to Timbuktu 4," MacWeek, Jun. 9, 1997, pp. 7.
Gianturco, Michael, "Souped-Up Windows," Forbes, Jul. 29, 1996, pp. 88.
Staten, James, "Windows Apps via the Internet," MacWeek, Jul. 22, 1996, pp. 14.
Petreley, Nicholas, "Broadway Debut Could Upstage Web-Based Trio Java, Active X, OpenDoc," RCVD Jul. 21, 1997.
"Software Will Run Windows Through Web Browsers," San Jose Mercury News, Jan. 27, 1997, pp. 4e.
"Microsoft Pursues Multiuser NT," IW Mar. 3, 1997, pp. 28.
Litzkow, et. al., Condor—a Hunter of Idle Workstations, Department of Computer Sciences, University of Wisconsin, 1988, IEEE.
Dossick, et. al., WWW Access to Legacy Client/Server Applications, 5th International World Wide Web Conference, May 6-10, 1996, Paris, France.
Systems Management Server for Windows NT, Administrator's Guide, Copyright 1993-1994 Microsoft Corporation.
Van Hoff, et. al., Hooked on Java, Addison-Wesley Publishing Company.
Walker, Advanced Imaging, vol. 10, No. 5, p. 18(3), May 1995.
Heylighen, World-Wide Web: a distributed hypermedia paradigm for global networking, SHARE Europe Spring Conference, pp. 355-368, Apr. 18, 1994.
Brown, Using Netscape 2, Que Corporation, 1995.
Gilder, The Coming Software Shift, Forbes ASAP, Aug. 28, 1995.
Dean, et. al., Java Security: From HotJava to Netscape and Beyond, Department of Computer Science, Princeton University, Copyright 1996, IEEE.
Hamilton, Java and JDBC: Tools Supporting Data-Centric Business Application Development, IBM Toronto Laboratory, Copyright 1996, IEEE.
Chandy, et al., A World-Wide Distributed System Using Java and the Internet, California Institute of Technology, Copyright 1996, IEEE.
Pazandak, et al., Interactive Multi-User Multimedia Environments on the Internet: An Overview of DAMSEL and it's Implementation, University of Minnesota, 1996, IEEE.
3 World-Wide-Web Browsers, telnet.w3.org, Mar. 16, 1998.
Fox et al., Towards Web/Java-Based High Performance Distributed Computing—An Evolving Virtual Machine, Syracuse University, Copyright 1996 IEEE.
Foster, et al., Enabling Technologies for Web-Based Ubiquitous Supercomputing, Copyright 1996, IEEE.
Friedman, et al., New Computational Architectures for Pricing Derivatives, Computational Intelligence for Financial Engineering, 1996.
Domel, Mobile Telescript Agents and the Web, COMPCON 1996, IEEE Computer Society International.
Arano, Emerging Technologies for Network Software Development: Past, Present, and Future, Computer Software and Applications Conference, 1996, COMPSEC.
Clark et al., DAWGS—A Distributed Compute Server Utilizing Idle Workstations, Proceedings of the Fifth Distributed Memory Computing Conference, Apr. 8-12, 1990, IEEE.
Farrallon Netopia Virtual Office, NETGUIDE, p. 24, Jun. 1997.
Johnston, Microsoft Pursues Multi-User NT, Information Week, p. 28, Mar. 3, 1997.
Pearlstein, Farrallon to Add Scripting Hooks to Timbuktu 4, MacWeek, p. 7, Jun. 9, 1997.
Robinson, Unwired Net, San Jose Mercury News, Jun. 8, 1997.
Hutheesing, Airship Internet, Forbes, p. 170, May 5, 1997.

Cook, 1997 A New Space Odyssey, US News and World Report, Mar. 3, 1997.
Markoff, Mercedes Puts Internet in Car, San Jose Mercury News, Apr. 29, 1997.
Boyd, Commercial Satellites Launch Unwired Planet, San Jose Mercury News, May 18, 1997.
Schine et al., The Satellite, Business Week, p. 62, Jan. 27, 1997.
Gianturco, Souped-Up Windows, Forbes, p. 88, Jul. 29, 1996.
Staten, The Window Apps Via the Internet, MacWeek, p. 14, Jul. 22, 1996.
Hardy, Irriduim Phone Project Maps an Upscale Orbit, The Wall Street Journal, p. B16, Jan. 10, 1997.
Rae-Dupree, More Data at Twice the Speed, San Jose Mercury News, p. 2C, Mar. 1, 1996.
Petrelee, Broadway Debut Could Upstage Web-Based Trio Java, Active-X, OpenDoc, Infoworld, Jul. 21, 1996.
Software Will Run Windows Through Web Browser, San Jose Mercury News, p. 4E, Jan. 27, 1997.

* cited by examiner

METHOD AND APPARATUS FOR CONTROLLING A COMPUTER OVER A TCP/IP PROTOCOL NETWORK

CROSS REFERENCE TO RELATED APPLICATIONS

This application claims the benefit of copending U.S. Provisional Patent Application No. 60/011,827, entitled Method and Apparatus for Controlling a Computer over a Wide Area Network, filed Feb. 16, 1996 on behalf of Paul L. Hickman and Michael L. Gough.

This application is related to copending U.S. patent application Ser. No. 08/798,703, filed Feb. 12, 1997 entitled Method and Apparatus for Controlling a Computer over a Wide Area Network of Paul L. Hickman and Michael L. Gough, filed on an even day herewith and owned in common with the present application, and incorporated herein by reference in its entirety.

TECHNICAL FIELD

This invention relates generally to networks of computer systems, and more particularly to wide area networks such as the Internet World Wide Web.

BACKGROUND ART

The Internet has, of late, become extremely popular. The origins of the Internet date back several decades to a U.S. government sponsored military/educational/business wide area network (WAN) that was designed to remain operational even in the event of the catastrophe, e.g. a major earthquake or a nuclear war. To accomplish this goal, robust protocols and systems were developed which allowed a non-hierarchical, geographically distributed collection of computer systems to be connected as a WAN such that the loss of a particular computer, or group of computers, would not preclude the continued communication among the remaining computers.

Each computer on the Internet can support one or more "entities" or "domains." These entities are addressed on the Internet with a domain name which uniquely identifies the domain. Individual users within a domain are provided with names unique to that domain. For example, to communicate with John Smith at a domain "hacksoft", electronic mail or "e-mail" could be sent, for example, to john_smith@hacksoft.com. The suffix "corn" means that the domain belongs to a commercial entity (e.g. a business), the suffix "gov" means that the domain belongs to a government entity, and the suffix "edu" means that the domain belongs to an educational entity (such as a University). Other suffixes are available, e.g. for specific foreign countries.

While the use of the Internet has been prevalent for many years now, its use has been limited by the arcane and difficult commands required to access the various computers on the network. To address this problem, a protocol known as the "World Wide Web" or "WWW" was developed to provide an easier and more user-friendly interface for the Internet.

With the World Wide Web an entity having a domain name creates a "web page" which provides information and, to a limited degree, some interaction with the entities "web site." By convention, Web pages are written in "hyper-text mark-up language", commonly referred to as "HTML." An address for a Web page site for a hypothetical company "Hacksoft" might be http//:www.hacksoft.com. The "http" is a prefix identifying the protocol, namely "hyper-text transfer protocol," the www refers to the World Wide Web, "hacksoft" is the domain name, and "com" means that it is a commercial enterprise. The full address for the Web page site, namely "http//:www.hacksoft.com", is known as the address or "URL" of the home page of the Web site.

A computer user can "cruise", i.e. navigate around, the WWW by utilizing a suitable web browser and an Internet service provider. For example, UUNET, America Online, and Global Village all provide Internet access. Currently, the most popular web browser is made by Netscape of Mountain View, Calif. The web browser allows a user to specify or search for a web page on the WWW, and then retrieves and displays the desired web page on the user's computer screen.

When a computer user "calls up" a web page, a variety of information may be displayed on the screen as determined by the entity maintaining the web site. HTML supports text and graphics, and permits "hyperlinks" that allow visitors to the web site to "jump" to (i.e. access and display) other web pages on the WWW. Therefore a person cruising the web may start on a web page of, for example, a company in Palo Alto, Calif., "click" on a hyperlink, and be connected to a web page of, for example, a University in the Netherlands. Clicking on a hyperlink on the on the Dutch University's web page may cause the user to be connected to a web page of, for example, a Government agency in Japan. In this fashion, the World Wide Web can be navigated and browsed for information in an intuitive and easy to use fashion, and information on computers from around the world may be accessed in an easy and intuitive manner.

Until recently, the World Wide Web was, essentially, primarily passive provider of information. There was some limited interactivity in that a computer user could leave certain information at a web site such as their name, address, phone number, etc. which could then be responded to by the entity maintaining the web site. Very recently, there as been an expansion of computational interaction over the World Wide Web. A system known as "Java™" developed by Sun Microsystems, Inc. of Mountain View, Calif. permits programs known as "Applets" to be transferred over the Internet, and run on a user's computer, regardless of the local machine's operating system or hardware. Java Applets are thus operating system and hardware independent. With Java software, a web page can be used to download an Applet to run on a computer user's machine. Typically, these Applets are small programs designed for a specific task, e.g. to create a graph, animate a display, or provide a spreadsheet, which serves a program function and is then discarded.

Before Java software, the World Wide Web resembled a large collection of hard disk drives which stored data retrievable by Internet users. With the advent of Java software, the World Wide Web is, in a limited fashion, gaining computational powers.

While Java software is a major advance in the functionality of the Internet, it still falls short of providing true computational power on the World Wide Web. Applets are small, typically transient programs designed for specific tasks. However, it is contemplated that it would be desirable to have a fully functioning computer system, such as a personal computer (PC), a workstation, a mini computer, a mainframe, or even a supercomputer that could provide vastly greater power and functionality to users of the World Wide Web. In addition, the presence of the computational power of larger systems on the Web would also provide for enhanced communication and functionality on the WWW, and would provide access to software applications that could not be implemented, in a practical manner, with an Applet.

There currently exists a species of software which permits a first computer ("master computer") to monitor and/or control the functionality of a second computer (slave computer). For example, the programs "Timbuktu" and "Carbon Copy" permit a master computer to control a slave computer, or to simply monitor the activity of the slave computer. More specifically, the screen of the master computer shows an image of the screen of the slave computer, and the keyboard and mouse of the master computer can provide inputs to (and thereby control) the slave computer.

DISCLOSURE OF THE INVENTION

The present invention permits virtually the entire functionality of a computer system to be made accessible to a wide area network such as the Internet. More particularly, the present invention permits a computer system to be run as a "virtual machine" through a web page provided at a web site on the World Wide Web (WWW).

The apparatus of the present invention includes a plurality of computers arranged in a wide area network (WAN) such as the Internet. At least one of the computers has at least one unique address designating a web site. A host computer system (which may or may not be one of the computers on the Internet) can be "posted" onto an "advertising" web page at the web site to permit other computers coupled to the Internet to interact directly with the host computer system. The computer "posted" on the web page is referred to as the "host" or "advertiser" computer, and computers accessing the host computer are referred to as "client" or "user" computers. Having the host computer posted on a web page creates a "virtual computer" that can be view and/or controlled by the client computers. Once the connection has been made between the host computer and one or more client computers, the web page is bypassed, i.e. the two or more computer systems communicate through the Internet without necessarily going through the web site supporting the "advertising" web page.

A client computer (which may or may not be one of the computers on the Internet) can interact with a host computer via the Internet in varieties of ways. For example, the client computer can be used to simply monitor the screen of the host computer. Alternatively, the client computer can be used to both monitor the screen of the host computer and to provide inputs to the host computer via a keyboard, mouse, or other input device. This, in certain circumstances, allows the client computer to control the functionality of the host computer. For example, the client computer can run a program on the host computer which provides the client computer with the aforementioned "virtual machine" on the Internet with computational powers that can be far greater than that provided, for example, by Java Applets. Also, the client computer can merely provide inputs to the host computer, without visual feedback, such as in a "blind bid" arrangement.

The present invention also allows a multiplicity of client computers to access the "virtual machine" via the Internet. This, in effect, allows multiple computer users to control a single host computer at a remote site. This can be very useful for collaborative activities performed over the Internet. Alternatively, a multi-tasking operating system on a host computer (such as Windows NT™ from Microsoft Corporation) would allow each window to be a "virtual machine" for one or more client computers.

An advantage of the present invention is that much greater computational power is accessible by users of the Internet and the WWW. The present invention will, for example, allow a client computer user to diagnose and fix problems on a host computer, run application programs that are available on the host computer, perform maintenance on the host computer, etc. Furthermore, users from multiple client computers can access a single host machine to permit collaborative or multiple individual efforts on that computer system.

These and other advantages of the present invention will become apparent upon reading the following detailed descriptions and studying the various figures of the drawings.

BEST MODES FOR CARRYING OUT THE INVENTION

Figure 1:
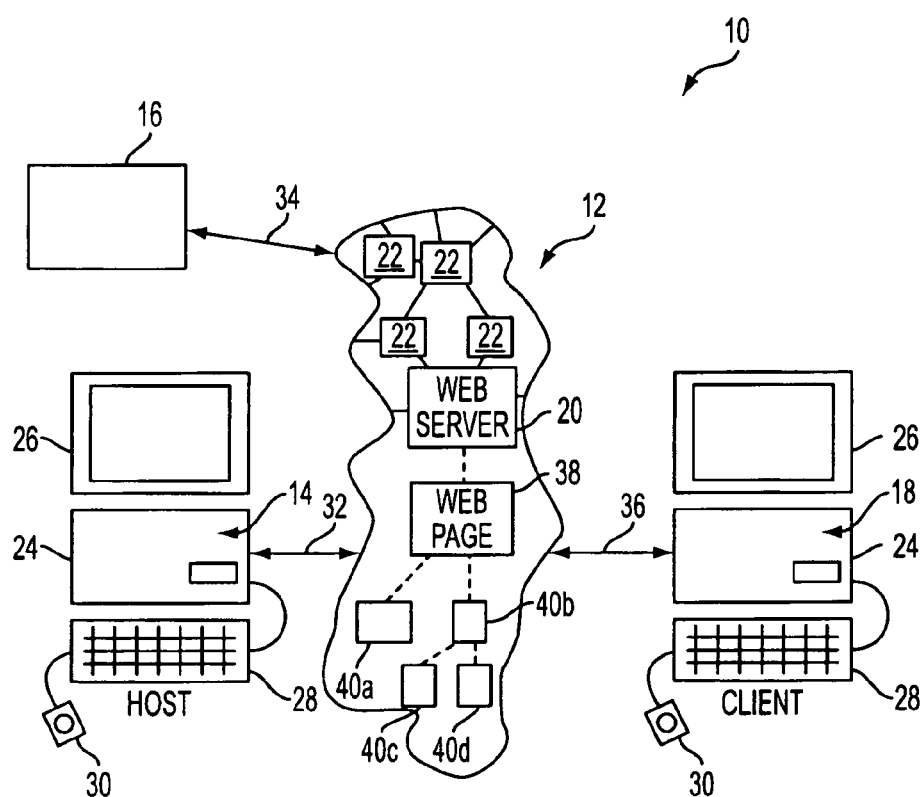
FIG. 1 is an illustration of an apparatus of the present invention.

In FIG. 1, a system 10 for controlling a computer over a wide area network such as the Internet 12 includes a number of computer systems, such as computer systems ("machines") 14, 16, and 18, that are coupled to the Internet 12. By implementing the processes, apparatus, and systems of the present invention, one or more of the computer systems 14–18 can monitor and/or access virtually the entire functionality of any other computers 14–18 connected to the Internet 12.

It should be noted that the semantics used herein can have multiple meanings. Looked at in one way, the machines 14, 16, and 18 are outside of the Internet 12 and communicate with the Internet by communication links. Looked at in another way, when the machines 14, 16, and 18 become a part of the Internet 12, i.e. the bubble surrounding the Internet 12 expands to include these machines. However, for the purpose of the present descriptions, a machine (e.g. a computer system such as a router, switch, or general purpose computer system) will be considered to be part of the Internet 12 if it examines and passes packets intended for other machines, and otherwise will be considered to be merely connected to the Internet.

While the preferred wide area network of the present invention is the well-known Internet, it should be noted that other network systems capable of supporting the processes and apparatus of the present invention can also be utilized as an intermediary area between one or more computer systems 14–18. For example, other WANS such as cabled WANS (both private and public), wireless WANS, fiber-optic WANS etc. can also practice the present invention with suitable modifications to the base processes that would be apparent to those skilled in the art. Further, as is well known to those skilled in the art, the Internet is only one instance of a network using "TCP/IP" data packet transmission protocols. For example, private "Intranets" using TCP/IP protocols are essentially privately operated equivalents of the publicly accessible Internet. The construction and use of TCP/IP protocol networks such as the Internet and private Intranets, and the TCP/IP protocol data packets (or simply "TCP/IP data packets") sent over such networks, is well known to those skilled in the art.

As noted previously, the origins of the Internet dates back several decades to a U.S. government sponsored military/education/business wide area network designed to survive the worst of catastrophes. The Internet includes a large number of linked computer systems, which will be referred herein as "web servers" such as a specified web server 20 and many other interconnected web servers 22.

In FIG. 1, web server 20 is shown to be "within" the Internet 12, i.e. it is connected as a node within the Internet as defined above. The architecture and operation of the Internet are well-known to those skilled in the art. For a description of the Internet and of the World Wide Web ("WWW") supported by the Internet, see *HTML Publishing on the Internet*, Kenny Chu and Francis Chin, McGraw Hill, 1996, the disclosure of which is incorporated herein by reference.

Each of the computer systems 14–18 typically include a processor unit 24, a video display ("monitor" or "screen") 26, a keyboard 28, and a "pointing" device such as a mouse 30. Computer systems such as computer systems 14–18 are well-known and are commercially available from a variety of manufacturers. In the following descriptions, the computer systems are described primarily in terms of Macintosh computer systems, although it will be appreciated by those skilled in the art that Microsoft Windows/Intel Microprocessor ("WINTEL") compatible computer systems, SUN and HP workstations, etc. can provide equivalent of functionality.

The computer systems 14, 16, and 18 can be coupled to the Internet 12 (and can be considered to become a part thereof) in a variety of fashions. These Internet connection are shown generically at 32, 34, and 36, respectively. For example, the computer system 14 may be connected to a web server 20 or 22 on the Internet 12 with a modem and telephone line, a digital connection such as an ISDN telephone line, through the intermediary of a local area network (LAN), etc. Methods and apparatus for coupling computer systems such as computer systems 14–18 to the Internet are well-known to those skilled in the art.

The various "web servers" on the Internet are simply computer systems of any type which conform to the well-known Internet communication protocols. These web servers have a tremendous variations in computing power, ranging from personal computers to mainframe computers. These web servers often include monitors, keyboards, mice, etc. However, the web servers 20 and 22 can simply be a "box" on the Internet 12 with limited or no local input or output capabilities.

As it is well-known to those skilled in the art, the Internet 12 can be accessed by computers 14–18 using a number of protocols. One of the easiest and most popular user interfaces is known as the World Wide Web (WWW) which is described, inter alia, in *HTML Publishing on the Internet*, supra. With the WWW, a web server 20 can support one or more "web pages," such as web pages 38, 40*a*, 40*b*, 40*c*, and 40*d*. A web page is a software constructed "object" including an interface written in HTML which permits text and images to be presented to a computer system that is coupled to or part of the Internet 12. A web page can include "hyperlinks" to other web pages, both on its local web server 20 and throughout the Internet 12. A "web site" on a web server 20 contains one or more web pages where a "base" or "home" page is the first or entry page into a desired web site. For example, the home page illustrated in FIG. 1 is the web page 38 which is linked via hyperlinks to additional web pages 40*a*–40*d*.

The method and apparatus of the present invention permits computer systems ("clients" or "users") to monitor or control the functionality of other computer systems ("hosts" or "advertisers") connected to the Internet 12 (such as computers 14–18), or which are a part of the Internet 12 (such as the web servers 20 and 22 which support "web pages"). As described herein, the "host" or "advertiser" machine becomes a "virtual machine" on the Internet 12 which can be accessed by the "client" or "user" machine. It should be noted that on the client or user side that any computer or machine ("platform") will be able to subscribe to a virtual machine, provided by any host platform. Thus, seemingly incompatible hardware could be used in concert; e.g. a WINTEL machine can be used as a client for a Macintosh host machine. In addition to providing great computational power through the Internet 12, the posting of a "virtual machine" on the Internet permits the client machine to be relatively low powered, i.e. an inexpensive computer system having a less powerful microprocessor, less memory, fewer peripherals etc. than the "virtual machine" provided by the host computer system.

As will be discussed in greater detail subsequently, and by way of example, the method and apparatus of the present invention permits a client computer system 18 to take over the functionality of a host computer system 14 such that the keyboard 28 and mouse 30 of computer system 18 provides inputs to the computer system 14, and such that images on the monitor of computer system 14 are replicated on the monitor 26 of the computer system 18. In this way, a "virtual machine" appears to be running on the monitor 26 of the client machine. In reality, the processing power and resources of the host system 14 are providing the "virtual machine" for the client computer system 18.

It should be noted that other inputs and outputs of the host machine 14 can also be sent and received by the client computer 18. For example, sounds generated by the computer system 14 can be "played" through the Internet 12 on computer system 18, while other inputs to computer system 18 (such as inputs from a tablet, not shown) can be transmitted for processing by the computer system 14. The capturing of outputs such as sounds and their transmission over the Internet is well known to those skilled in the art. Likewise, the transmission of other data representing inputs over the Internet would be well within the scope of those skilled in the art.

Figure 2:
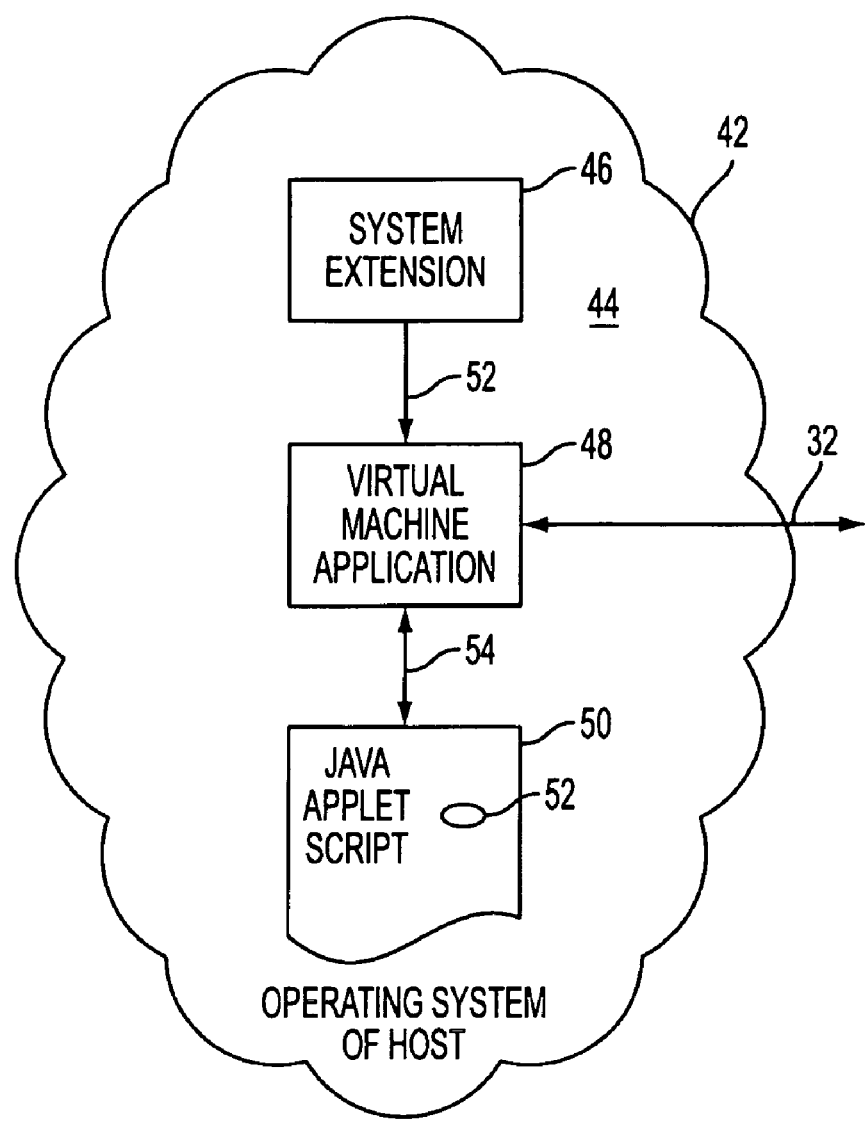
FIG. 2 is an illustration of the processes running on a host computer system of FIG. 1.

FIG. 2 illustrates a process 42 that can run on a host computer system, such as computer system 14. In a preferred embodiment of the present invention, the process 42 can originate entirely from a "host machine" i.e. from a host computer such as computer system 14. In other embodiments of the present invention, processes of the present invention may be distributed over the Internet to, for example, the web server 20 or to a client machine, such as on computer system 18.

In the process 42 of FIG. 2, an operating system 44 of the host supports a "system extension" 46, a virtual machine application 48, and a Java Applet script 50. The virtual machine application communicates with or becomes part of the Internet 12 over the link 32 as described previously. Java is commercially available, as is well known to those skilled in the art. The creator of Java software is Sun Microsystems of Mountain View, Calif., who makes Java software and various Java software utilities commercially available. Microsoft Corporation of Redmond, Wash. also has a commercially available version of Java software known as J++ software which implements standard Java software with additional support for Microsoft's ActiveX software.

The system extension 46 is also known, in the Macintosh world, as an "init." The system extension 46 is patched into the operating system 44 of the host computer system at system boot-time ("during power-up"). As such, the system extension 46 becomes part of the operating system of the host and "patches", "modifies", and "enhances" the functionality of the operating system. The purpose of the system extension 46 and the process 42 of the present invention will be discussed in greater detail subsequently.

The virtual machine application 48 is a computer program or "process" running from a host computer system, such as computer system 14. A virtual machine application is therefore started in a standard fashion to other application programs running on personal computer systems. For example, a computer system using a graphical user interface ("GUI"), an application program may be started (sometimes referred to as "executed", "evoked", "launched" etc.) by selecting and activating an icon representing the application program with a pointer controlled by an input device such as a mouse. Alternatively, the virtual machine application can be started by a number of other conventional techniques, such as with a selection from a pull-down menu, the entry of the name of the program on a command line, by a use of an alias, etc. The virtual machine application receives information from a system extension 46 as indicated by the arrow 52 and communicates with the Internet 12 via the communication link 32.

The Java Applet script 50 is a piece of "dead code" on the host computer system, i.e. it is not executed on the host computer system. Embedded in the Java Applet script is the Internet address 52 of the host machine. The virtual machine application 48 is preferably capable of changing the Java Applet script in that it can modify the script based on a number of criteria, and can also send the Applet onto the Internet 12 via the link 32. The virtual machine application 48 and the Java Applet script 50 interact as indicated at 54.

In other words, the virtual machine application 48 preferably generates a Java Applet script 50 by embedding the Internet address of the host machine as a constant in an existing Java Applet script 50 which has an undefined value for the Internet address. The completed Java Applet script 50 executes on the client machine and is described with reference to FIG. 11. Since the script is transmitted over the TCP/IP network from the host machine (or, alternatively, by another server on the Internet 12) to the client machine for execution, the script (in this example a Java Applet script) will be referred to generically as a "client program" that is "delivered" via the TCP/IP network. The virtual machine application 48 can send the Java Applet script 50 onto the Internet 12 via the link 32.

Figure 3:
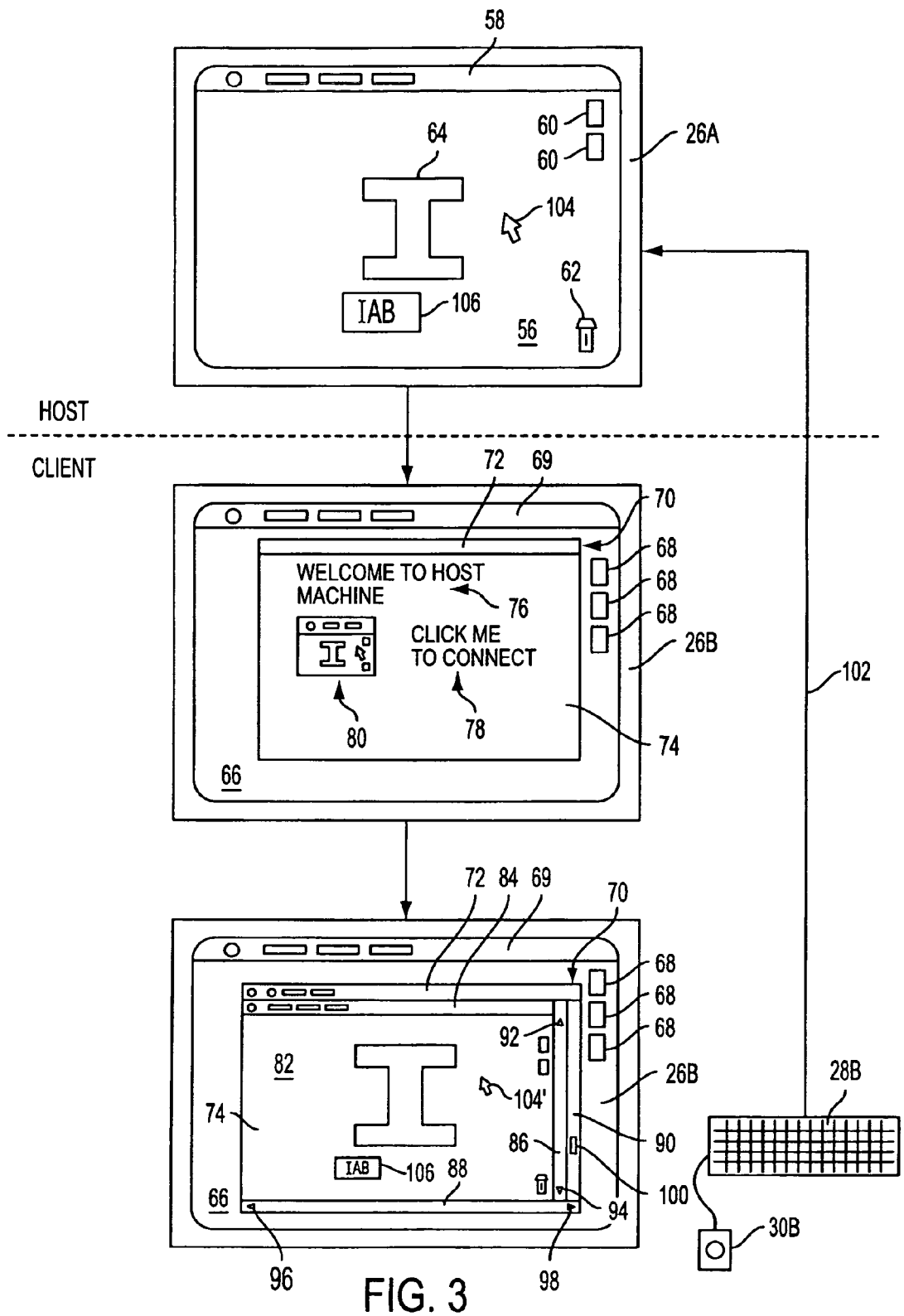
FIG. 3 is an illustration of the screen of a host computer and corresponding screens of a client computer of the system of FIG. 1.

In FIG. 3, a monitor 26*a* of a host computer (such as a host computer system 16) and the monitor 26*b* of a client computer (such as client computer 18) are illustrated. The host computer monitor 26*a* includes a screen 56 displaying a number of images. More particularly, the screen 56 displays a menu bar 58, a number of icons 60 and 62, and one or more images 64. A monitor 26*b* of the client includes a screen 66 that can include a number of icons 68, a pull-down menu bar 69, and a "browser" window 70. The browser window is generated by a suitable browser program that permits the navigation of web pages over a TCP/IP network such as the Internet or an Intranet. An acceptable browser of the present invention is the popular Netscape™ browser made by Netscape, Inc. of Mountain View, Calif. having built-in Java capabilities.

The window 70 created by the browser includes a menu bar 72 and a page display area 74. In this instance, the display area 74 shows the "home page" created by a host machine, such as computer system 14. The home page 74 includes a greeting 76, instructions 78, and an icon 80. This icon 80 can be any suitable icon, such as a picture of a computer, or it can display the actual image displayed on the screen 56 of the host computer monitor 26*a*. In the latter instance, the icon 80 can be static or dynamic, i.e. the image displayed by the icon 80 can be a "snap shot" of the display on screen 56 at a particular point in time, or it can be dynamically updated to show changes in real time being made to the display of the monitor 26*a*.

At the bottom of FIG. 3, the monitor 26*b* shows the screen 66, icon 68, and pull-down menu bar 69 of the client computer system. Shown displayed on the screen 68 is the web browser window 70 having the menu bar 72. However, within the web browser 70 window area 74 is the image of the screen 56 of the host computer forming a "virtual computer" window 82. The virtual computer window 82 includes a pull-down menu bar 84, a vertical pan bar 86, a horizontal pan bar 88, and a zoom bar 90. The image within the virtual window 82 is at least a portion of the image displayed on the host computer monitor 26*a*. However, due to space and resolution limitations, the virtual computer window 82 may not be large enough or have a high enough resolution to show the entire image on the screen 56 of the host computer monitor 26*a*. For this reason, the vertical pan 86 includes scroll buttons 92 and 94 to allow an up and down vertical scrolling ("vertical panning") of the image displayed in the virtual computer window 82, the horizontal scroll bar 88 includes left and right scrolling buttons 96 and 98, respectively, to permit a left and right lateral scrolling ("lateral panning"), and a sliding zoom control 100 permits a zooming in and zooming out of the image displayed within the virtual machine window 82 to accommodate more and less of the image displayed on the screen 56 of the host machine 26*a*. It should be therefore noted that the method and apparatus of the present invention permits a "translation" of resolutions between the host computer and the client computer.

It will be apparent from the diagram of FIG. 3 that the image on the screen of the host computer 26*a* can be viewed within the virtual machine window 82 of the client machine monitor 26*b*. In addition, computer inputs from the client keyboard 28*b* and the client mouse 30*b* are coupled as indicated by the arrow 102 to the host computer to control the functionality of the host computer. Therefore, by way of example, movement of the client computer mouse 30*b* can control the position of a pointer 104 on the screen 56 of the host computer 26*a*. Also typing on the keyboard 28*b* of the client computer can, for example, input alpha-numeric characters into a window 106 of the host computer. Of course, such inputs will results within the virtual machine window of the client computer, i.e. the display pointer 104' will move and characters will appear within a window 106' within the virtual machine window 82 of the client computer.

It will be noted that the present invention makes use of the Java programming language provided by Sun Microsystems, Inc. of Mountain View, Calif. As it will be apparent from the following descriptions, this provides a convenient method for implementing the processes and systems of the present invention from a host computer. Alternatively, other processes of the present invention will distribute the computational tasks among various web servers 20 and 22 on the Internet 12 and/or distribute computational tasks to a client computer, such as computer system 18.

As it is well known to those skilled in the art, the terms "click," "select," and the like refer to the act of using a pointer, such as a mouse 30B, to position a pointer icon, such as a pointer icon 104, on a computer screen, such as computer screen 56, and then activating ("clicking") a button to cause an action at the location pointed to by the pointer icon 104. For example, clicking can press a button, open a file, activate a program, draw a line, etc. By "post" or "posting", it is meant that a computer implemented process is executed which causes a host machine coupled to the Internet to become available as a "virtual machine" on the Internet. The "virtual machine" refers to the fact that a fully functional computer appears to be available in the virtual machine window 82 of the client machine when, in fact, the actual computer can be anywhere on the Internet or can be any computer coupled to the Internet. In this way, the host computer is capable of being "accessed" by the client computer. For example, the virtual machine functionality may be provided by the computer system 14, the computer system 16, the web server 20, or any of the web servers 22 as long as they subscribe and implement the "virtual machine" protocols and processes of the present invention.

Figure 3D:
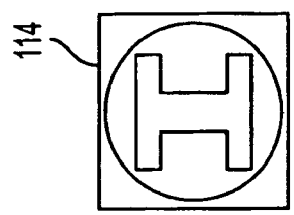
FIGS. 3*a*–3*d* illustrate four modes of interaction with the host machine of the system of FIG. 1
Figure 3C:
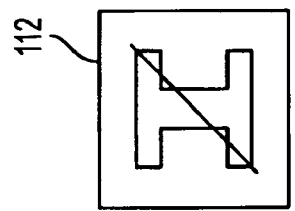
Figure 3B:
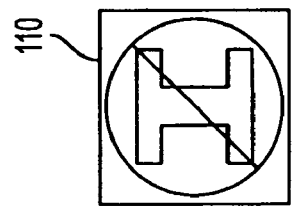
Figure 3A:
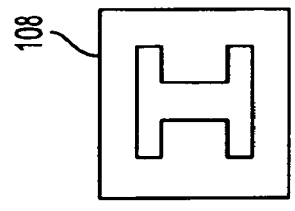

In FIGS. 3a–3d, various icons that can be displayed on the web page 74 for the "virtual machine" implemented by computer system 14 are illustrated. These icons can be used in place of icon 80 of FIG. 3, or in addition to icon 80. Icon 108 of FIG. 3a indicates that the "virtual machine" representing computer system 14 will permit complete input and output access to the computer system 14. The icon 110 of FIG. 3b indicates that no input or output is permitted to the computer system 14. This icon might be present, for example, if computer has already been pre-empted by another user (client) and if collaboration is not permitted. In FIG. 3c, the icon 112 indicates that no output is allowed from computer 14, but that inputs via keyboard, mouse, etc. are permitted. This mode might be permitted in blind bid or posting situations. In FIG. 3d, icon 114 indicates that outputs from the computer system 14 are permitted, but that inputs are not permitted. In the mode illustrated in FIG. 3d, the user of computer system 18 is essentially monitoring ("eavesdropping on") the computer system 14, but is not permitted to modify or influence its operation.

Figure 4:
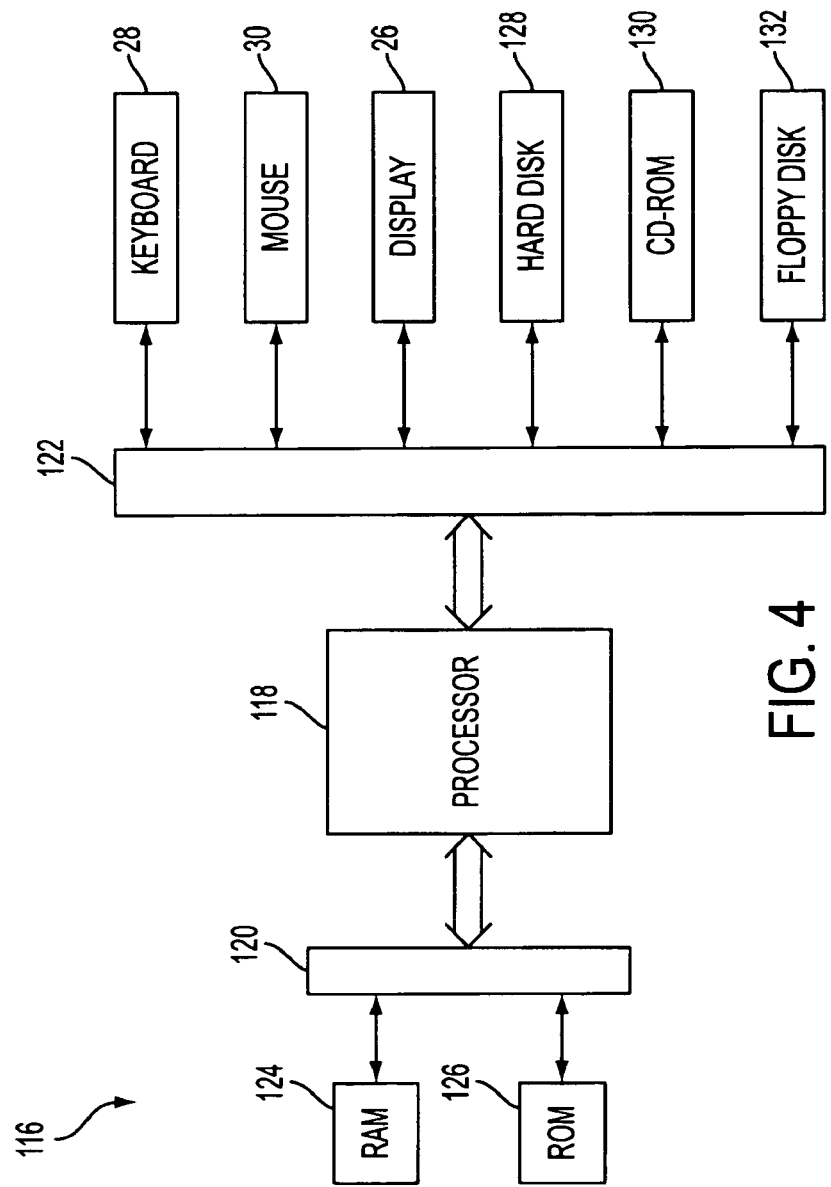
FIG. 4 is a block-diagram of an exemplary computer system in accordance with the present invention.

As noted from the above discussion, there are many "computer systems" involved in a wide area network such as the Internet. These computer systems include the computer systems 14–18 and some of the web servers 20 and 22. An exemplary block diagram of a single such computer system is shown in FIG. 4. More particularly, a computer system 116 in accordance with the present invention includes a processor 118, a high speed memory bus 120, and an input/output (I/O) bus 122. The processor 118 is coupled to both the memory bus 120 and the I/O bus 122. Coupled to the memory bus is typically random access memory (RAM) 124 and read only memory (ROM) 126. A number of "peripherals" can be coupled to the I/O bus including the keyboard 28, the mouse 30, the display 26, a hard disk 128, a CD ROM 130, and a floppy disk 132. The storage components of the computer systems are instances of "computer readable media", such as random access memory (RAM) 124, CD ROM 130, and floppy disk 132. Of course, various driver cards and driver protocols ("drivers") may be required for the various peripherals as well as special drives and media as it is well known to those skilled in the art.

Figure 5:
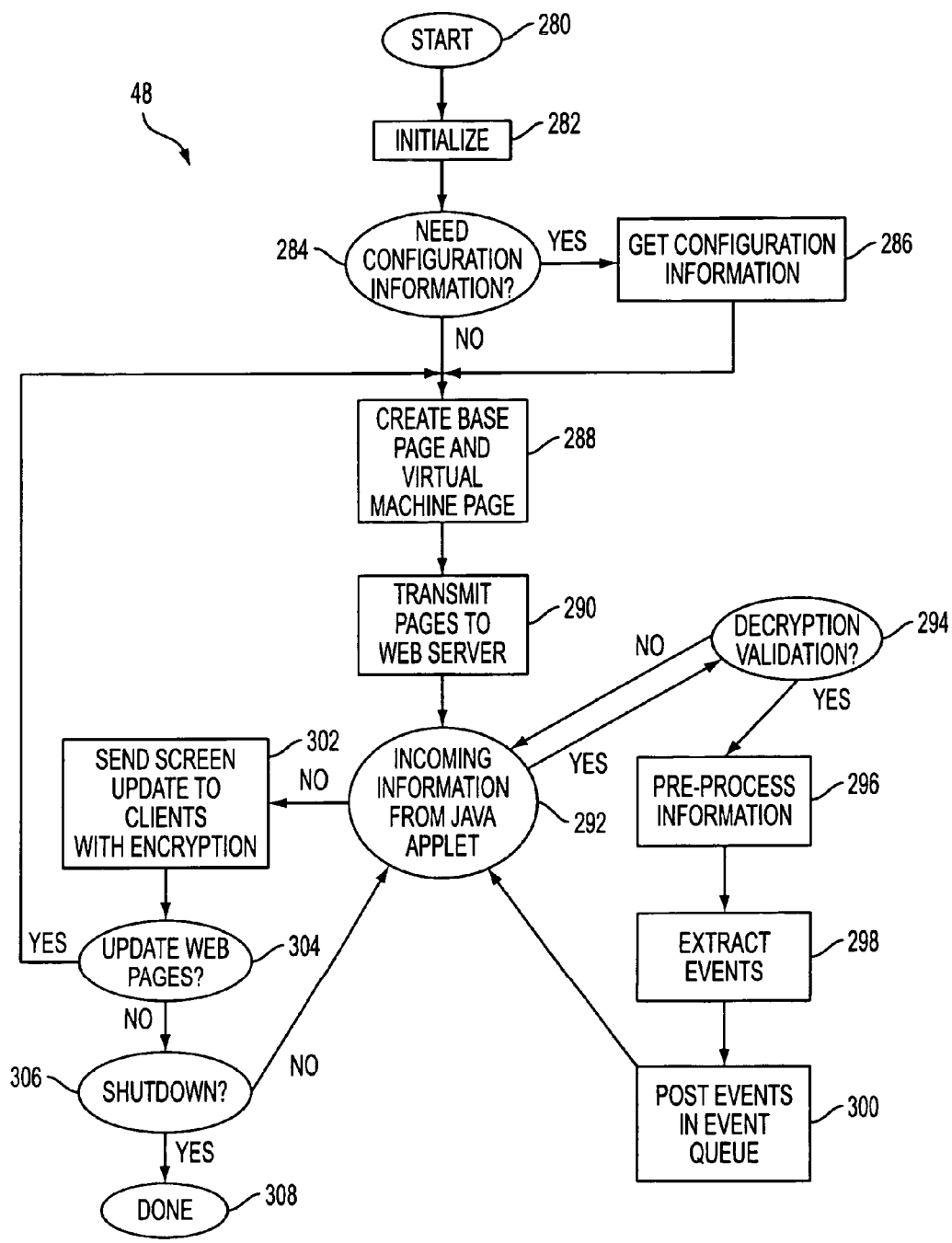
FIG. 5 illustrates the process implemented by the virtual machine application program 48 of FIG. 2.

In FIG. 5, the virtual machine application 48 of FIG. 2 is illustrated in greater detail. This process will also be referred to as the "host program", since it runs on the host. The process 48 is an application program running on the computer system, e.g. on a Macintosh computer system, on a WINTEL computer system, on a workstation, etc. The process 48 begins at 280 and, in a step 282, the application program is initialized; the code of the application is loaded into memory, and internal data structures are initialized. Next, in a step 284, it is determined whether the process 48 needs configuration information. If so, the configuration information is obtained in a step 286. Once the process 48 has the necessary configuration information, a step 288 creates a base page and a virtual machine page. Next, in a step 290, the base page and the virtual machine page are transmitted to the web server 20 over the Internet 12.

The decision step 292 determines whether there is incoming information from a Java Applet. If there is, a decision step 294 determines whether there is a decryption validation. If not, step 294 returns process control to step 292. If there is decryption validation, a step 296 pre-processes the information. A step 298 then extracts the events from the information, and then events are posted into the event queue of the host computer system (such as computer system 14) in a step 300. In this way, a client computer can "control operations" of the host computer as if the keyboard, mouse, etc. of the client computer were directly coupled to the host computer. Of course, keyboards and mice (a "pointing device") are just two instances of input devices producing "input device events."

If there is no incoming information from a Java Applet as determined by step 292, a step 302 will send screen updates to the client with the proper encryption. The screen updates, which may be with or without encryption (depending on the application) contains "image information" that can be used to create an image to be displayed on a monitor of a client machine. A step 304 then determines whether the web pages should be updated, preferably by checking if a fixed period of time has elapsed since the last update. If the web pages are to updated, process control is returned to step 288 to create new base page and virtual machine pages. If the web pages are not to be updated, a decision step 308 determines whether shut-down of the host computer system is desired. If not, process control is returned to step 292, and if shut-down is desired, the process 48 is complete as indicated at 308.

Figure 6:
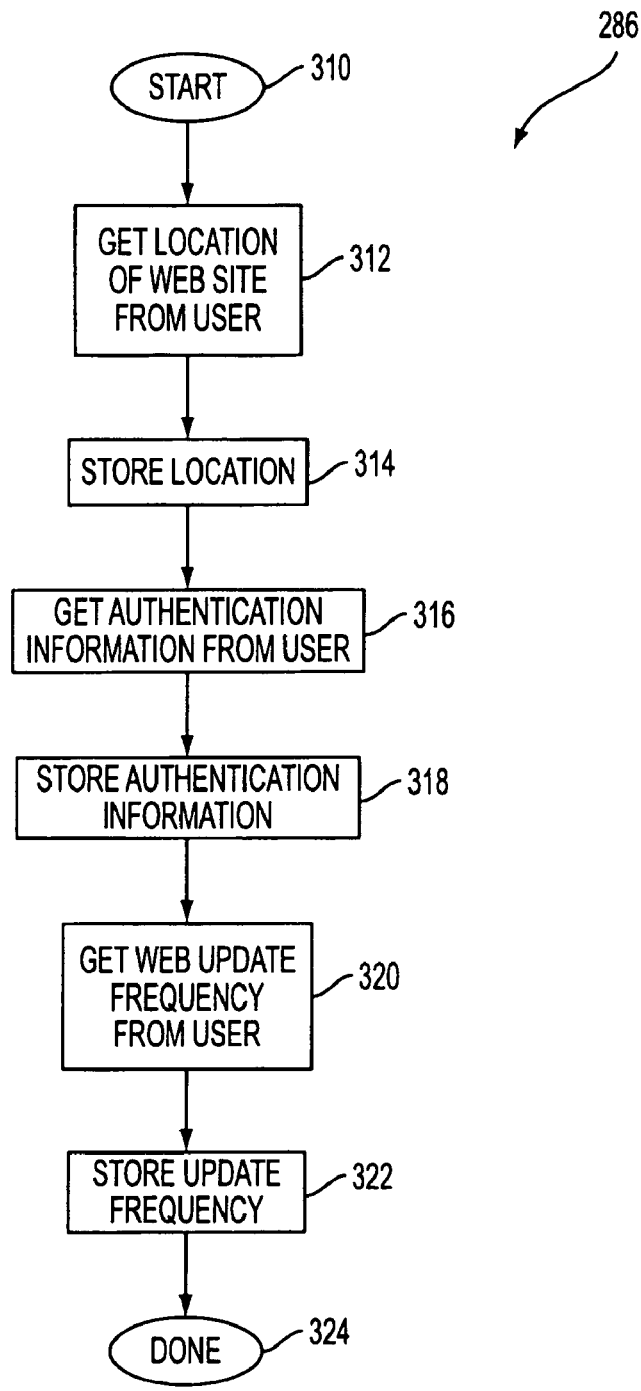
FIG. 6 illustrates the "Get Configuration Information" step 286 of FIG. 5.

In FIG. 6, the process 286 "Get Configuration Information" of FIG. 5 is illustrated in greater detail. Process 286 begins at 310 and, in a step 312, the location of the web site is obtained from the user. This web site location is an address on the World Wide Web that is supported by the web server 20. Next, in a step 314, the location of the web site is stored. A step 316 retrieves authentication information from the user, which is stored in a step 318. Next, in a step 320, the web update frequency is received from the user, and the update frequency is stored in a step 322. The process is then completed at 324.

Figure 7:
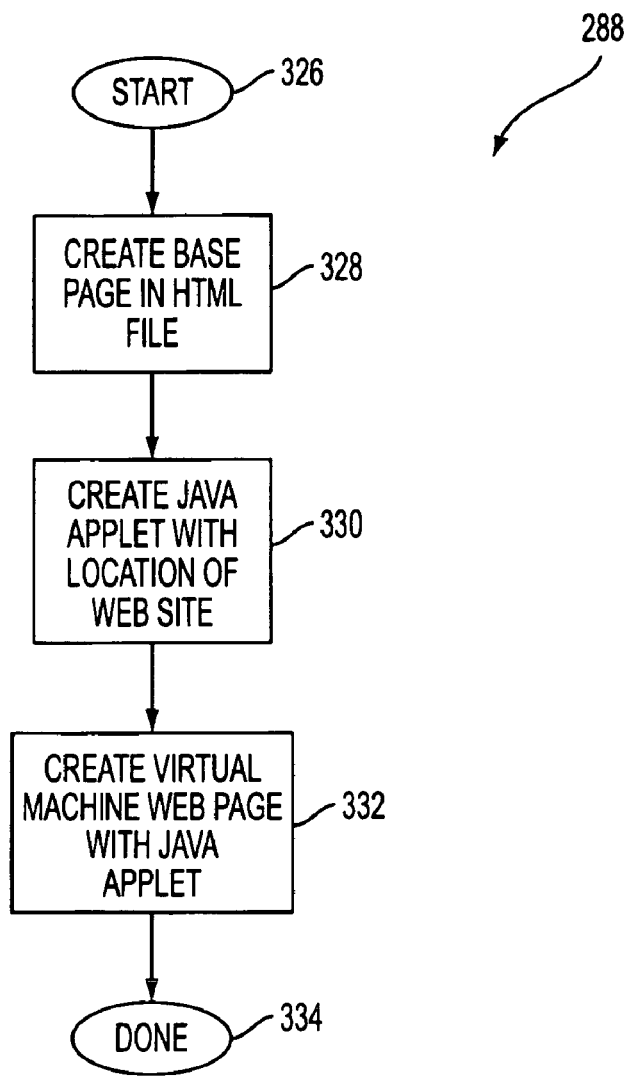
FIG. 7 illustrates the "Create Base Page and Virtual Machine Page" step 288 of FIG. 5 in greater detail.

In FIG. 7, the step 288 "Create Base Page and Virtual Machine Page" of FIG. 5 is disclosed in greater detail. More particularly, process 288 begins at 326 and, in a step 328, a base page HTML file is created. The creation of web pages with HTML file is well known to those skilled in the art, and there a variety of utilities available on the commercial market for the creation of pages with HTML files. Next, in a step 330, a Java Applet with the location of the web site is made available. In other words, a Java Applet script of FIG. 2 is created, modified, or used in its stored form. Finally, in a step 332, a virtual machine web page with the Java Applet is created. The process is then completed at 324.

Figure 8:
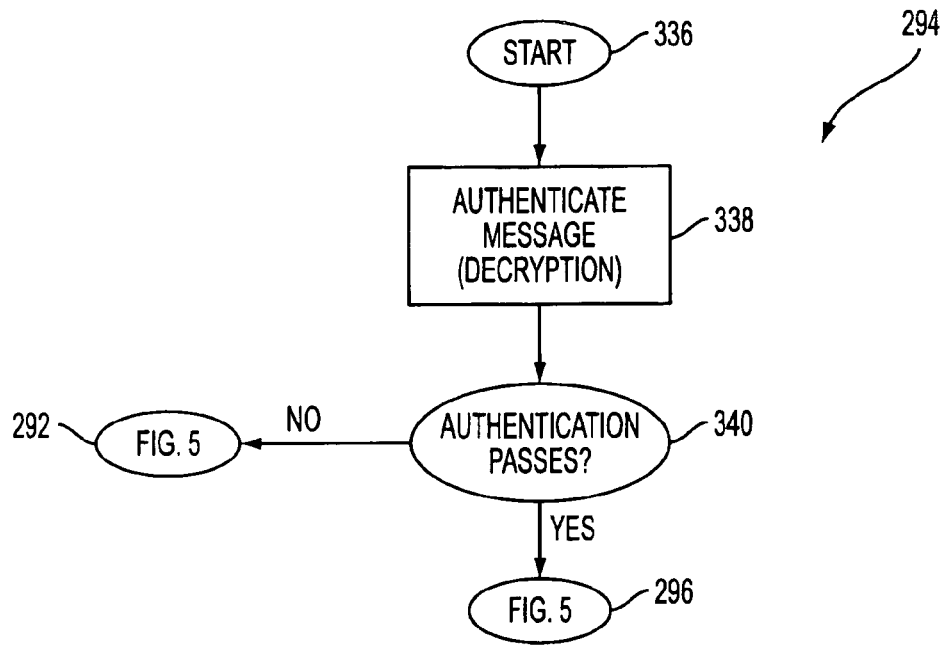
FIG. 8 illustrates the "Decryption Validation?" step 294 of FIG. 5.

In FIG. 8, the step 294 "Decryption Validation" of FIG. 5 is illustrated in greater detail. A process 294 begins at 336 and, in a step 338, the message is "authenticated." This authentication involves the decryption of the message using a supplied password. A step 340 then determines whether the authentication passes and, if so, process control is turned over to step 296 of FIG. 5. If authentication does not pass, process control is turned over to step 292 of FIG. 5.

Figure 9:
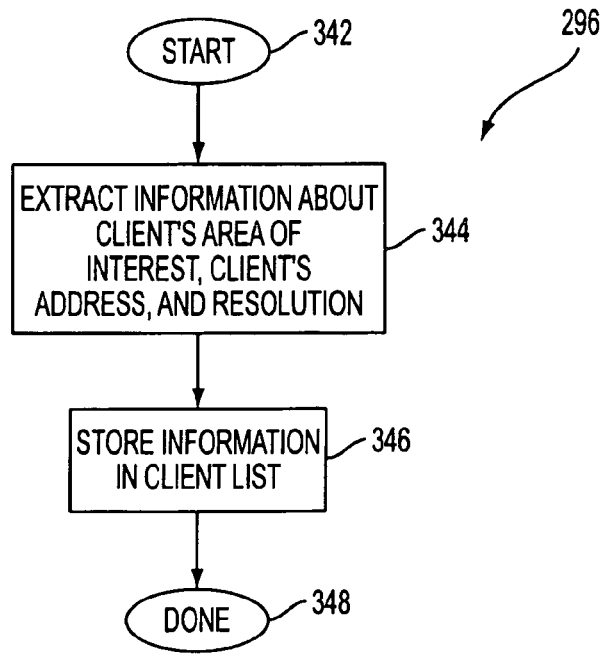
FIG. 9 illustrates the "Pre-Process Information" step 296 of FIG. 5.

In FIG. 9, the step 296 "Pre-Process Information" of FIG. 5 is illustrated in greater detail. The process 296 begins at 342, and a step 344 extracts information about the client's area of interest, the client's address, and the resolution of the client computer screen. This information is stored in a client list step 346, and the process is completed at 348. The client list can include multiple clients, each of which will have information concerning their areas of interest, their Internet address, and their screen resolution.

Figure 10:
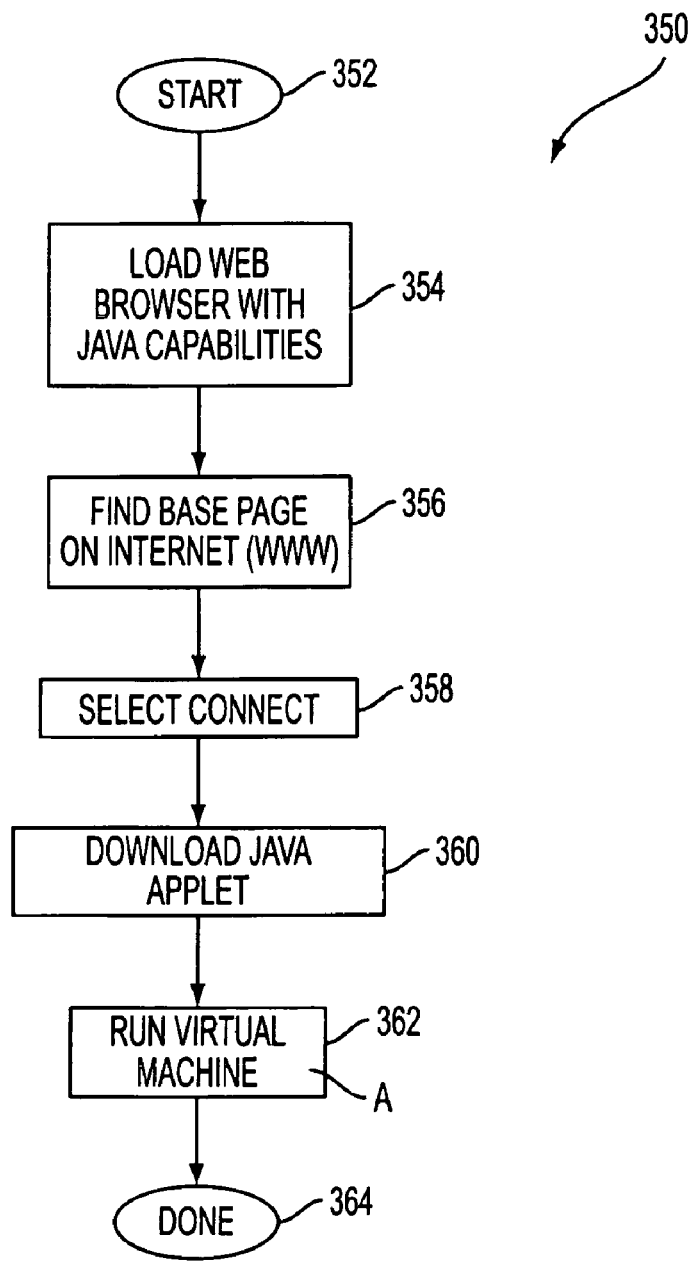
FIG. 10 illustrates a process 350 of the present invention implemented on a client machine of the system of FIG. 1.

In FIG. 10, a process 350 for running on a client machine (such as computer system 18) is disclosed. This client process can be implemented completely in commercially available software, and is described herein for the sake of completeness. The process 350 begins at 352 and, in a step 354, a web browser with Java capabilities is loaded. As noted previously, the Netscape web browser with Java is suitable for use of the present invention. Next, in a step 356, a base page is found on the Internet World Wide Web (WWW). This is accomplished by using the navigation functions of the web browser. Next, in a step 358, the client selects the "connect" option of the base page of the present invention, and in a step 360, a Java Applet is downloaded to the client system. A step 362 then runs the "virtual machine," which essentially is running the host computer system while displaying the video and other outputs on the client computer system, with inputs to the client computer system being transmitted to the host computer system. The process is then completed at 364.

Figure 11:
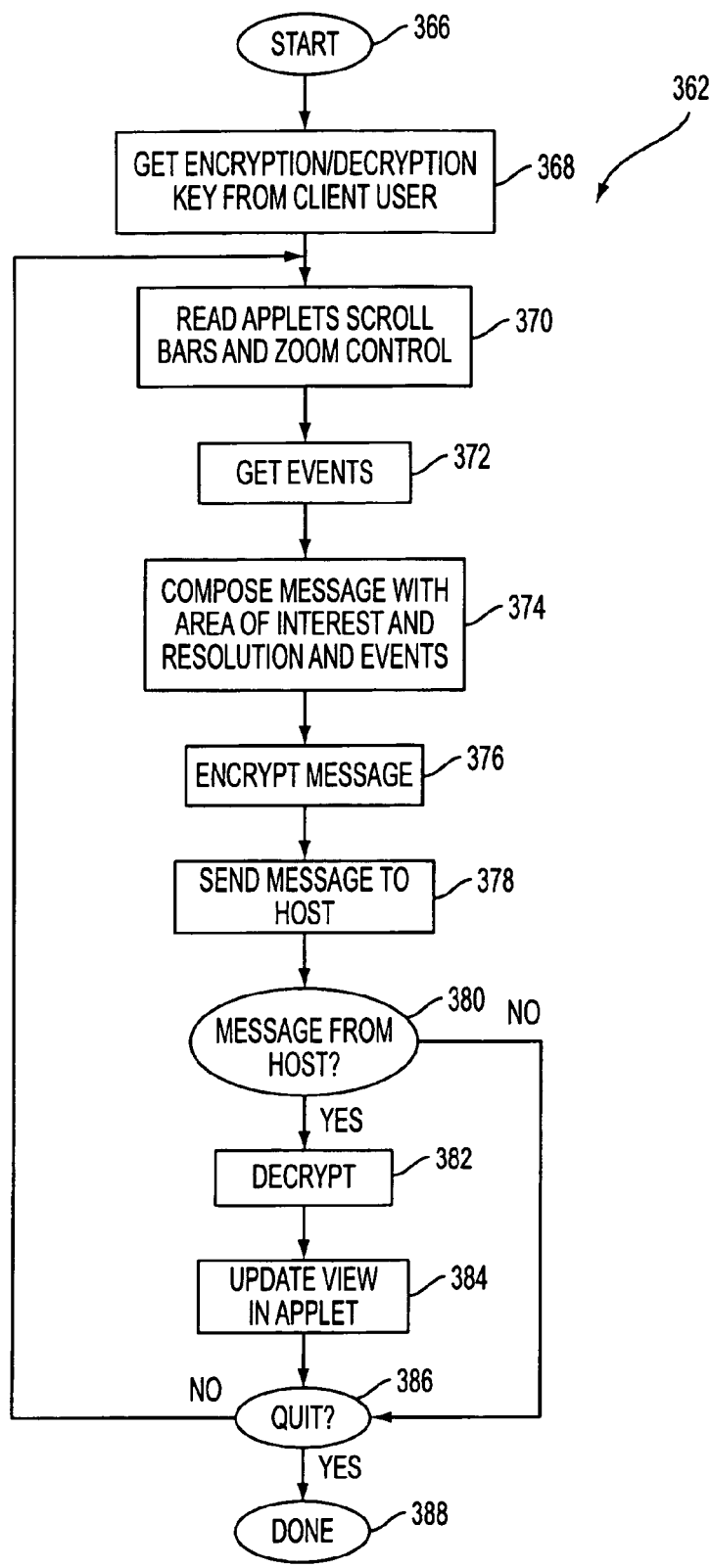
FIG. 11 illustrates the "Run Virtual Machine" step 362 of FIG. 10.

The step 362 "Run Virtual Machine" of FIG. 10 is illustrated in greater detail in FIG. 11. Process 362 begins at 366 and, in a step 368, the encryption/decryption key ("password", "keyword", etc.) is obtained from the client user. Next, in a step 370, the Applet's virtual machine window's scroll bars and zoom control are read. A step 372 gathers events from the client user. Next, in a step 374, a message is composed with an area of interest in the client computer screen (i.e. in the client computer's video frame buffer), along with the appropriate resolution and events. The composed message is the encrypted in a step 376, and is sent to the host in a step 378.

A decision step 380 determines if there is a message from the host. If there is, the message is decrypted in a step 382, and then the Applet controlled virtual machine window is updated in a step 384. In other words, the image information transmitted over the TCP/IP network from the host machine to the client machine is displayed in the browser window of the client machine, as appropriate. If there is no message from the host, or after updating the virtual machine window, it is determined in a step 386 if the process 362 is to be terminated. If not, process control is returned to step 370. If the process 362 is determined to be terminated in a step 386, the process is completed at 388.

The use of Java and Applets is well known to those skilled in the art and is described, for example, in *Hooked on Java, Creating Hot Web Sites with Java Applets*, Arthur van Hoff, Sami Shaio, and Orca Starbuck of Sun Microsystems, Inc., Addison-Wesley Publishing Company, 1996, the disclosure of which is incorporated herein by reference.

Again, by "virtual machine," it is meant that the functionality of a computer system, such as computer system 14, can be accessed by another computer system, such as computer system 18, in such a fashion that it appears that there is a "virtual" computer running in a window of computer system 18 from the Internet. Therefore, by "posting," i.e. "entering," a computer system 14 onto the Internet 18, a "host" computer is posting itself as a "virtual machine" for use by others, i.e. "clients." By accessing a "virtual machine" on the Internet, a user or "client" can operate and run the "virtual machine" from their own computer.

By "collaboration," it is meant that multiple clients can access a single host machine simultaneously. For example, if computer systems 16 and 18 both desire to access the virtual machine of computer system 14, this would be possible if collaboration were permitted. This functionality permits network-wide collaboration over the Internet 12. Alternatively, if the host machine is running a multi-processing system, multiple clients can simultaneously access processes on the host machine. For example, if the host machine is a personal computer running Windows NT™ from Microsoft Corporation of Redmond, Wash., each client ("web user") could occupy its own window, or some windows could be shared by multiple clients.

If a computer system 12 which has become a client ("web user") of a host ("advertiser") machine 14, the display can be "clicked" or selected to indicate that they wish to become a client. The connection is then made through the Internet such that the client computer 18 can eavesdrop on ("monitor") or remotely access ("control") the host machine 14 through the Internet. A password may be required for security reasons to prevent the unauthorized uploading or downloading of program code and data without the password, i.e. to prevent access to the remote computer. For example, by eliminating remote access absent the correct password, a computer system 14 is given a degree of protection against computer viruses, unauthorized uploading of computer files, etc. It is therefore desirable for at least one of the client program on the client computer, the server computer, or the host computer implement password protection before allowing substantial "access" to the host computer.

It is therefore apparent that a method permitting the remote control of a host computer comprising in accordance with the present invention includes: (a) providing TCP/IP data packets including a client program to a client computer connected to a network and running a browser program having a browser window, the client program permitting the client computer to at control and view image output of a host computer also connected to the network; (b) receiving TCP/IP data packets at the host computer over the network that originated from the client computer, the data packets including remote computer control information produced in response to the manipulation of least one of a keyboard and a pointing device of the client computer; and (c) transmitting TCP/IP data packets including image information generated from the image output of the host computer to the client computer for use by the client program to provide images in the browser window, where the image output can be affected by the remote computer control information.

It should also be apparent that a method for controlling a computer over a network in accordance with the present invention includes: (a) providing a computer network that can communicate with a TCP/IP protocol; (b) coupling a host computer to the network; (c) coupling a client computer to the network, the client computer having a monitor capable of displaying images and an input device capable of generating input device events; and (d) controlling the host computer with the client computer via TCP/IP data packets sent over the network, such that the input device events of the client computer can be acted upon by the host computer, and such that display information of the host computer can be viewed upon the monitor of the client computer.

While this invention has been described in terms of several preferred embodiments, it will be appreciated that there are alterations, permutations, and equivalents which fall within the scope of this invention. It should also be noted that there are alternative ways of implementing both the process and apparatus of the present invention. For example, the described methods pertaining to the host computer are generally described in terms of a Macintosh computer system. It will therefore be apparent to those skilled in the art that when the host computer processes are implemented on other computer systems, such as MS-DOS, Microsoft Windows 95, and UNIX computer systems, that the methodology may require some modification. However, such modifications will become readily apparent to those skilled in the art after studying preceding descriptions and studying the drawings. It is therefore intended that the following appended claims cover all such alterations, permutations, and equivalents that fall within the true spirit and scope of the present invention.

What is claimed is:

1. An apparatus for remotely controlling a computer comprising:

a TCP/IP protocol network;

a client computer coupled to said TCP/IP protocol network, said client computer having a monitor, a keyboard, and a pointing device, said client computer running a browser program displaying a browser window on said monitor, said browser program being capable of navigating among web pages over said TCP/IP protocol network, said client computer further being capable of running a client program, said client program being delivered to said client computer over said TCP/IP protocol network, said client program encrypting event data and transmitting said encrypted event data over said TCP/IP protocol network, said encrypted event data including an input device event created by at least one of said keyboard and said pointing device; and a host computer coupled to said TCP/IP protocol network and being capable of being accessed by said client computer, said host computer being capable of receiving and decrypting encrypted event data and placing said decrypted event data in an event queue of said host computer, said host computer running a host program that is responsive to said keyboard and said pointing device due to the event data in the event queue, said host program encrypting image information and transmitting said encrypted image information over said TCP/IP protocol network for subsequent display by said client computer after decryption of received encrypted image information by said client program, said image information including a portion of a video buffer image within said host computer;

wherein said host computer is initially accessed by said client computer through a web page accessible over said TCP/IP protocol network, and wherein said client computer and said host computer communicate directly or indirectly with TCP/IP protocol data packets over said TCP/IP protocol network after a connection between said host computer and said client computer has been established.

2. An apparatus for remotely controlling a computer as recited in claim 1 wherein said TCP/IP protocol network is at least one of the Internet and an Intranet.

3. An apparatus for remotely controlling a computer as recited in claim 1 wherein said client program is a Java Applet program.

4. An apparatus for remotely controlling a computer as recited in claim 1 wherein said client program is transmitted to said client computer over said TCP/IP protocol network along with the address of said host computer.

5. An apparatus for remotely controlling a computer as recited in claim 1, wherein said host computer and said client computer each have an operating system selected from the group including Macintosh, Microsoft Windows, Microsoft Windows NT, and UNIX operating systems.

6. An apparatus for remotely controlling a computer as recited in claim 1 wherein a correct password from said client computer is required for it to access the functionality of said host computer.

7. An apparatus for remotely controlling a computer system as recited in claim 1 wherein said host computer provides access information concerning its accessibility by a client computer.

8. An apparatus for remotely controlling a computer system as recited in claim 1 wherein said host computer provides at least one of view only information and view-and-control information to said client computer.

9. An apparatus for remotely controlling a computer system as recited in claim 1 wherein access information with regards to said host computer is displayed by said client machine.

10. An apparatus for remotely controlling a computer system as recited in claim 1 wherein said browser program frames at least a portion of said image information displayed on said client computer system.

11. An apparatus for remotely controlling a computer system as recited in claim 1 wherein said client machine can pan said image information displayed on said client computer.

12. An apparatus for remotely controlling a computer system as recited in claim 1 wherein said client machine can pan its display at least one of horizontally and vertically.

13. An apparatus for remotely controlling a computer system as recited in claim 1 further comprising a server coupled to said TCP/IP protocol network to provide an introduction between said host computer and said client computer.

14. An apparatus for remotely controlling a computer system as recited in claim 1 wherein the availability of said host computer is advertised over said TCP/IP protocol network.

15. An apparatus for remotely controlling a computer system as recited in claim 1 wherein said client machine indicates to a server coupled to said TCP/IP protocol network that it wishes to be connected with said host computer.

16. An apparatus for remotely controlling a computer system as recited in claim 1 wherein said web page accessible over said TCP/IP protocol network is hosted by a server coupled to said TCP/IP protocol network.

17. An apparatus for remotely controlling a computer system as recited in claim 1 wherein a user of said client computer uses an access parameter to access said host computer.

18. An apparatus for remotely controlling a computer system as recited in claim 1 wherein a plurality of client computers are coupled to said host computer.

* * * * *